Dec. 19, 1939.   L. LAMER   2,183,683
WINDOW PANE HOLDING DEVICE AND THE LIKE
Filed Aug. 4, 1938
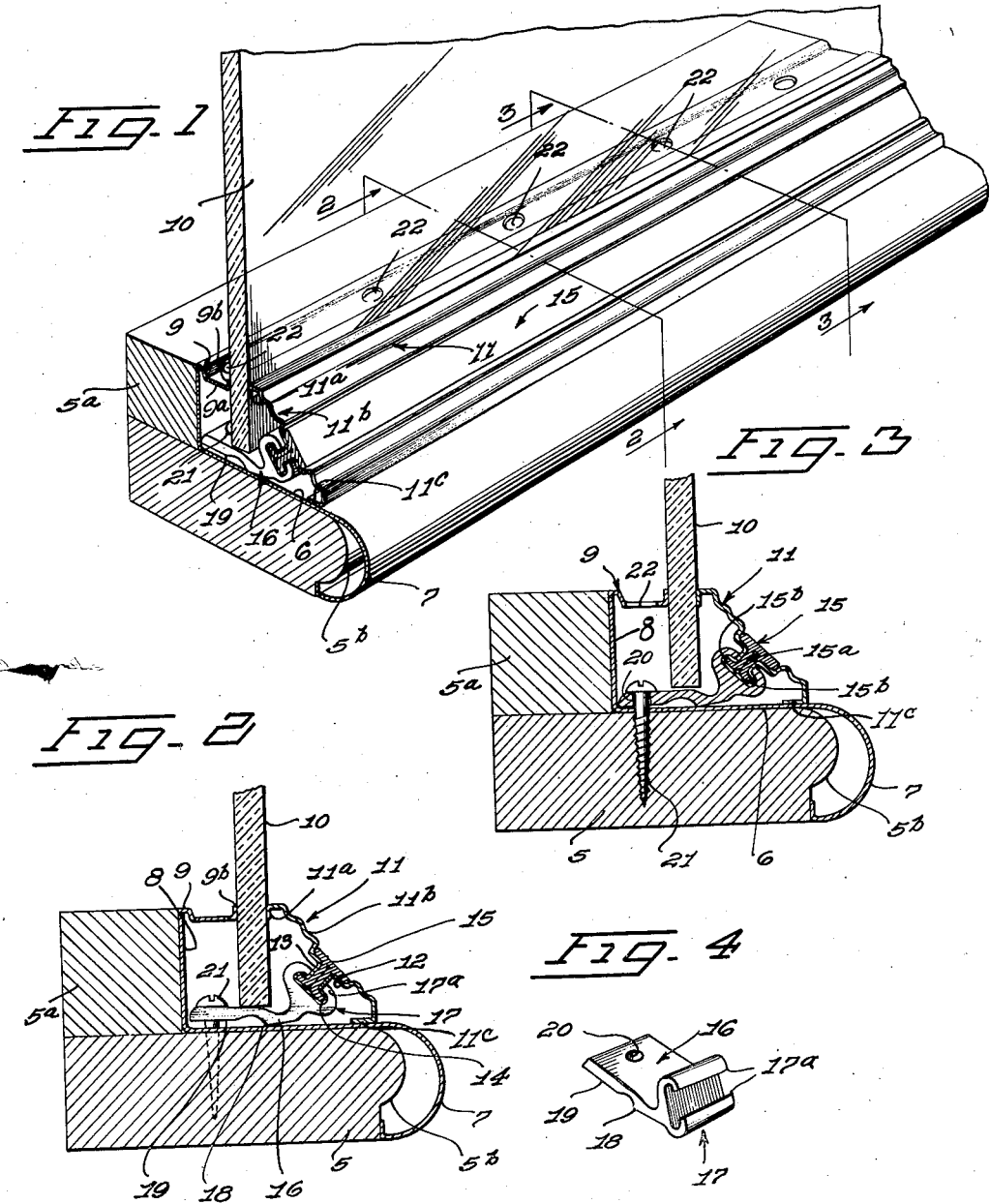

Patented Dec. 19, 1939

2,183,683

UNITED STATES PATENT OFFICE 2,183,683

WINDOW PANE HOLDING DEVICE AND THE LIKE

Louis Lamer, Ramsey, N. J.

Application August 4, 1938, Serial No. 223,086

3 Claims. (Cl. 20—56.4)

My invention relates to improvements in window pane holding devices and while susceptible of other application is especially applicable to store front construction.

The invention has among its primary objects to provide in a window sash, store front construction or the like, a very simple and effective molding construction for holding the glass in a manner to allow for expansion and contraction while at the same time maintaining a tensioning pressure at one side of the glass pane, the nature of the invention being such that no fastening elements, such as screws or the like, nor any holes are left at the exterior of the window pane.

My invention further contemplates a construction as characterized which is relatively inexpensive to manufacture, neat and attractive in appearance, easy to install, and highly efficient in practical use.

More specifically the invention contemplates a novel glass holding molding construction which incorporates a relatively springy exterior molding member adapted to grip the exterior surface of the glass in resilient fashion to hold it against a comparatively rigid rear support; and further aims to provide novel lineally spaced means operable from the inner side of the window for tensioning various areas of the exterior molding member.

Furthermore the invention has for an object to provide a novel exteriorly positioned glass-engaging molding member having a novel reinforcement extending lineally throughout its length, and which reinforcement may and preferably does form a part of the means for bringing about a tensioned engagement of such exterior molding member with the glass.

The invention also resides in certain novel features of construction, combination and arrangement of the various parts,—all of which will be clear to those skilled in the art upon reference to the following descriptive matter in connection with the accompanying drawing which illustrates what is now regarded as the preferred form of the invention. It is to be understood, however, that the invention is susceptible of other mechanical expressions within the spirit and scope of the subject matter claimed hereinafter.

In the drawing, wherein the same reference characters have been used to designate the same parts in all views:—

Figure 1 is a fragmentary perspective view of a portion of a store front or window construction embodying my invention;

Figure 2 is a cross sectional view taken on line 2—2 of Figure 1;

Figure 3 is a cross sectional view taken on the line 3—3 of Figure 1; and

Figure 4 is a perspective view of the actuator member for the front clamping, molding member.

Referring to the drawing by reference characters, numeral 5 denotes the bottom member of a store front window frame—or a sash, and it will be noted that same is provided with the upstanding rear portion 5a. The window frame or sash 5, 5a may be made in one piece and rabbeted out, or the portions 5, 5a may be separate.

In carrying out the invention I provide the metal sheet 6 which is coextensive with the frame 5, 5a and has the curved forward portion 7 which is turned up to underlie the frontal bead 5b of the frame or sill member 5 as shown. The metal sheet 6 has its rear portion turned upwardly as indicated at 8, and then at approximately the top of the frame portion 5a such metal sheet portion 8 has the forwardly extending portion 9 which is formed with the channel 9a whose outer wall provides the glass-engaging upstanding portion 9b.

The front molding member is generally designated as at 11 and is formed of relatively springy sheet metal having its inner edge provided with the downturned lip 11a which engages the glass 10 to hold it against the lip or portion 9b of the sheet metal member 6, 8, 9 previously referred to. It is to be understood, of course, that the front molding member 11, as in the case of the rear member 6, 8, 9, will be coextensive with the margin of the window and its frame or sash, 5, 5a.

In carrying out the invention as to the front molding member 11, the same will preferably be provided with the longitudinal corrugations 11c so as to lend strength to such member 11 while at the same time permitting some degree of transverse flexation so as to allow for expansion and contraction and yet at the same time hold the glass pane 10 firmly in place.

As shown in the drawing, the front holding member 11 has its front portion turned down and inwardly as at 11c to lie upon the upper surface of the metal sheet 6 inwardly of the front curved portion 7 thereof. Thus no sharp edges of the molding member 11 are exposed at any point.

Intermediate the glass pane engaging portion 11a and the frontal supporting portion 11c of the member 11, the same is provided with a channel 12. This part of said front molding member 11 is formed to provide a T-shaped recess or channel 13, 14—the stem of such T-shaped channel opening into the channel 12 while the head portion of such T-shaped channel opens into the stem portion 13, all as shown in the drawing.

Of course the surface channel 12 and T-shaped channel or groove-way 13, 14 extends throughout the length of the front molding member 11.

As best illustrated in Figures 2 and 3, the front-molding member 11 is provided with the substantially I-shaped bar having its head portion 15 filling the channel 12 and its stem and base portion 15a, 15b occupying the stem and head portion, respectively, of the T-shaped channel 13, 14, and substantially filling the same. From the foregoing it will be understood that the front molding member 11 is reinforced intermediate its rear and front edges by the substantially I-shaped rail or bar member 15, 15a, 15b. This confines transverse flexation of the front molding member 11 to the front and rear portions thereof at either side of the reinforcement 15.

Coming now to the means for effecting clamping engagement of the front molding member 11 against the pane of glass 10, it will be noted that I provide means generally designated at 16 which takes the form of an irregularly shaped lever having the head-portion 17 formed by inwardly curved opposed arms 17a which define the recess which is adapted to receive the T-head recess defining portion of the front molding member 11, the arms 17a of such head portion being adapted to engage or substantially engage the stem recess defining parts 13 of said front molding member 11. Thus the head portion 17 of the lever-like member 16 engages the medial portion 13, 14 of the front molding member 11 which is reinforced by the I-shaped rail or bar member 15, 15a, 15b. Of course it is to be understood that there will be provided a plurality of the lever-like members 16 and they can be inserted in place upon front molding portion 13, 14 before same is put in place upon the sheet metal member 6 and brought into engagement with the window pane or glass 10.

Referring to the lever-like clamping member 16 more in detail, the same is provided inwardly of its head portion 17 with the off-set 18 which terminates in the rearwardly extending arm 19 whose rear end abuts the upstanding portion 8 of the member 6. The portion 19 of the lever-like member 16 is provided with the vertical hole 20 which is adapted to receive the screw 21 which takes in the sill or frame member 5 as shown. Access is had to said screw 21 through a hole 22 in the channel 9a of the portion 9 of the sheet metal member 6, 8.

It may here be stated that the front molding member 11 lends itself to ready manufacture in a rolling operation to define the portions 11a, 11b, 11c, 13, 14, 12. Following the turning out of the front molding member 11 as mentioned, the reinforcing I-bar or rail will be inserted in place as shown. It will be obvious also that the frame-carried sheet metal member 6, 7, 8, 9 can be turned out in a simple rolling operation or the like.

The operation of the window pane clamping means described will probably be obvious from what has been said, but is nevertheless summarized as follows:

When making an installation of my invention the sheet metal member 6, 7, 8, 9 is first fixed in place and screws or the like may be used for this purpose, although it would not be necessary to apply any screws forwardly of the area which will be overlain by the front molding member 11 when in place. Next, the front molding member parts 11, 15, etc. having been assembled as shown the heads of the various lever-like members 16, 17 are supplied to portions 13, 14 of the front molding 11 at properly spaced points by simply being slid into place on portions 13, 14 of such front molding member. Of course, the spacement of the lever-like member 13 will have to be such that the screws will be aligned with the holes 22 in the channel portion 9a of member 8, 9. This having been done the screws 21 are started into the sill or frame 5, the metal sheet member 6 having holes through which the screws 21 pass. Now the glass 10 is inserted in place on suitable bottom edge supports (not shown) and the screws 21 are turned down to cause the offset 18 of the lever 16 to bear against the surface of plate 6 following which further turning of screws 21 causes arms or levers 16 to rock counter clockwise upon offset 18 as a fulcrum so as to clamp the bearing portion 11a of the front molding member 11 tightly against the front surface of the glass 10. Of course, it will be understood that the front molding members 20 on but two sides only of the frame of the window can be applied initially; but it is a simple matter to apply the front molding members 11 to the other two sides after the first two sides have been fixed.

When it is desired to tension any particular portion of any section of the front molding 11 it is only necessary to tighten up the screws 21 in that area. The arrangement is such that no exposed screws, openings or other fastening members appear at the exterior portion of the window. The I-bar or beam will preferably be of contrastingly colored metal as compared to the metal forming the major portion of front molding member 11 thus lending to the exterior molding an ornamental appearance.

Having thus described my invention what I claim as new is:

1. In a window construction or the like including a frame and front and rear glass engaging members, the combination of an I-shaped re-inforcing member incorporated in said front member, and frame-carried drawing means positioned inwardly of and concealed by said front member and connected to one edge of the said reinforcing member whereby when the drawing means is operated it will draw the said front member toward the said rear member.

2. In a store front window construction or the like including a frame, a sheet metal glass-engaging molding provided with a lineally extending substantially T-shaped groove opening from its exterior surface and formed at its rear surface with a substantially T-shaped rib whose head is spaced from the rear surface of said molding, and a reinforcing filler strip in said T-groove and substantially conforming to the cross-sectional shape thereof.

3. In a store front window construction or the like including a frame, a sheet metal glass engaging molding provided with a lineally extending substantially T-shaped groove opening from its exterior surface and forming at its rear surface a substantially T-shaped rib whose head is spaced from the rear surface of said molding, a reinforcing filler strip in said T-groove and substantially conforming to the cross-sectional shape thereof, and jaw headed actuators carried by said T-shaped rib.

LOUIS LAMER.